(No Model.)
W. L. SILVEY.
PROCESS OF MAKING BATTERY PLATES.
No. 523,055. Patented July 17, 1894.
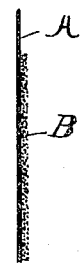    
FIG 1   FIG 2   FIG 3   FIG 5   FIG 4
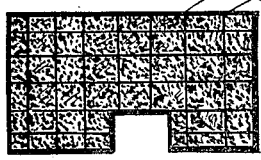 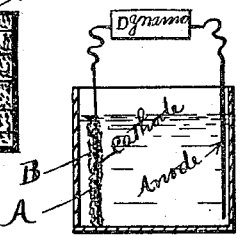 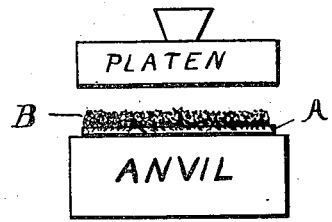
FIG 6   FIG 7   FIG 8
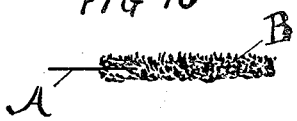 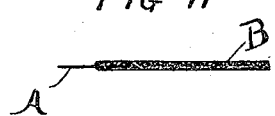
FIG 10   FIG 11
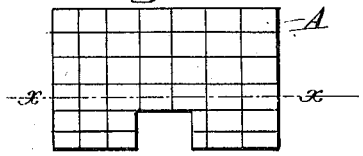
Fig. 12.   Fig. 13.
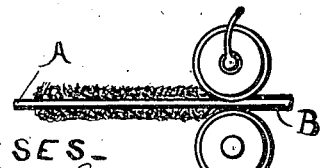
FIG 9
WITNESSES—
John Kirby Jr
C U Raymund
INVENTOR—
William L Silvey

UNITED STATES PATENT OFFICE.

WILLIAM L. SILVEY, OF DAYTON, OHIO.

PROCESS OF MAKING BATTERY-PLATES.

SPECIFICATION forming part of Letters Patent No. 523,055, dated July 17, 1894.

Application filed September 9, 1892. Serial No. 445,417. (No specimens.)

*To all whom it may concern:*

Be it known that I, WILLIAM L. SILVEY, a resident of Dayton, in the county of Montgomery and State of Ohio, have invented certain new and useful Improvements in Making Battery-Plates, of which the following is a specification.

My invention relates to a new and useful battery plate or electrode, it being the principal object of my present invention to produce a battery plate, which is easily prepared, quick to produce, inexpensive, extremely efficient, light and very durable.

My invention further relates to a new article of manufacture in the way of battery electrodes, which are peculiarly adaptable as both the positive and negative elements of a so-called secondary or storage battery.

My present invention relates to electrode plates or supports, primarily coated or combined with active material, or material adapted to become active, which active material is prepared by electrical decomposition or disintegration, and deposited by electrical deposition.

The invention further consists in the method of constructing secondary battery elements or electrodes by electrically coating or combining suitable plates or supports with electrically deposited active material, in contradistinction to the Faure-Brush method of preparing active material, then mechanically applying it to the support plate, and to the well known Planté process of forming electrodes by the slow process of oxidizing and deoxidizing the plates themselves, by charging electrodes repeatedly in a reverse direction, after their having been submitted to a chemical disintegrating.

Referring to the accompanying cuts which are made a part hereof, Figure 1 shows an edge view of a sheet electrode, having the active material electrically applied according to my invention. Fig. 2 shows an edge view of a plain sheet electrode having the active material applied to both sides, according to my invention. Fig. 3 shows a corrugated plate having the corrugations filled with the active material according to my invention. Fig. 4 shows another form of plate with the active material surrounding a central core. Fig. 5 shows an edge view of a ribbed receptacle plate which may be corrugated with the active material filling the openings between the ribs. Fig. 6 shows a perforated plate having the active material electrically deposited onto the grid and into the perforations. Fig. 7 shows my method for electrically preparing and depositing the active material onto the plates. Fig. 8 shows one method of firmly uniting the plate and an active material into a firm coherent mass. Fig. 9 shows another method of firmly uniting the active material and the support plate or plate to be a support plate. Fig. 10 shows a mass of active material having a spongy nature, from which a self supporting electrode is to be formed. Fig. 11 shows the spongy plate after it has been consolidated by pressure into a coherent mass. Fig. 12 is a side view of a perforated plate or grid similar to that referred to in Fig. 6, except in that case the plate is shown without any filling, it being explanatory of the other figures. Fig. 13 is a longitudinal cross section of Fig. 12 along the dotted line X X.

It will be observed by an examination that my method is a radical departure from all other methods heretofore proposed for producing battery plates or electrodes. The Brush or Faure process required the monoxide of lead or peroxide of lead, or sulphate of lead, a preliminary process, before a successful battery plate can be obtained. This oxide of lead or lead in a finely divided state having been produced by the oxidation of lead by heat, the next step required is its application to a conducting support plate of lead or equivalent metal. This second step in the Faure process is accomplished by mixing the oxide of lead with a solution of sulphuric acid and water, and spreading it onto the plate in the form of a paste. The Brush process requires the lead oxide to be in the form of a powder, which is consolidated into and onto the support plate by very heavy pressure. These processes are very unsatisfactory for many reasons among which are the great cost of the material which is used for making the plates active, and another reason, where very heavy pressure is exerted as required in the Brush process for applying a powdered active material to the support or grid the grid is invariably strained or broken by the heavy pressure exerted to make it coherent, and the life of the plate is shortened if not totally ruined in its preliminary preparation whereas I employ only crude material for making both my support plates and the material with which they are garnished in their preliminary manufacture, and the plate is not strained or injured in any way.

In carrying my invention into effect it is to be understood I use lead or a lead alloy for my battery electrodes, plates or grids, and the active material or material to become active is also lead.

I first prepare the primarily conducting part of my battery plate in a suitable number of convenient size and shape, as for instance a plain sheet, perforated plate or one woven out of wire into a cloth or grating or the conductor may consist of parallel rods or plates united together in any convenient way, or the plates may consist of a sheet having ribs upon its surface or pockets or holes extending entirely through the plate having the holes or pockets filled with active material or covering the surface according to my improved method of decomposing a lead anode by electrolytic action and depositing the same in a form adaptable to become the absorbent material of a secondary battery electrode.

As a primary step in the manufacture of my battery plates, I take a suitable containing vessel, and prepare a solution of a salt of an alkaline metal and water, into which I now admix a liquid solution of an acetic acid or the acetate may be introduced in the solid form and dissolved afterward. Into this solution I now lay the battery plates to which the active material is to be applied, the plates serving the part of the cathode to a suitable electric generator or dynamo machine, and to which it is attached by a suitable connecting wire. As an anode I now immerse a suitable plate of lead and electrically connect it with the positive side of the electrical generator. The electrical current now being applied to the plates, the anode will be rapidly broken down and deposited upon the battery plate in an adherent spongy mass, the particles of lead being of so minute a character as to float in masses ranging from the size of a hazelnut up to a larger size in the liquid in case they become detached from the plate, but these masses of floating lead, do not become detached from the cathode unless the electric current is of too low intensity to do practical work, and they do not become redissolved in the solution in case they become detached. The only practical deposit can be obtained by having the electric current of considerable intensity, when the deposit is of a firm character, being of a beautiful silvery white color, and of a stringy granular nature. If the electrical disintegrating and depositing operation be performed in a glass vessel and by using an electric current of considerable intensity the lead may be observed with the naked eye, becoming detached from the anode. This process of decomposing lead and depositing it upon a plate, thereby becoming adaptable as a secondary battery electrode, must not be confounded with the ordinary electro-plating process, as employed for copper, nickel, gold and silver, all of which establish an intimate union between the cathode and electro-deposited coating, whereas in this process no such intimate union occurs through any electrical action, the particles of lead merely adhering to the cathode and to each other by the force of gravity and the peculiar felting adhesive quality of the lead tentacles or sponge a quality peculiar to it only. These lead tentacles will not become dissolved off the cathode into the solution when once deposited, and neither is the anode or cathode dissolved except by the aid of an electric current.

By this process of manufacturing battery plates, I am able to produce ready formed negative battery plates in less than a day, whereas to form the active material of red lead or litharge used in the Faure and Brush battery, the formation cannot be done in less than thirty hours, and should be continued from forty to fifty hours, whereas in the Planté process of forming the plates it will take months. During the disintegration of the anode the battery plate is covered with a heavy superimposed layer of spongy lead, (all perforations being filled at the same time,) which by a light pressure is made to adhere to the plate all over, and form a firm contact with the plate itself. The plates having received a sufficient deposit of the electrically deposited spongy lead, are now removed from the depositing bath, and I prefer to remove all traces of this solution, by washing rinsing, or pickeling them in an aqueous solution. They are now taken and assembled into a suitable number to form a battery element and immersed in a solution of sulphuric acid and water, in which lead is practically insoluble, of a specific gravity of about 1.170 and charged by the passage of an electric current in the usual manner, one of the plates or electrodes has its coating or filling peroxidized and forms the oxygen element of the battery, while the other plate or electrode absorbs hydrogen, thus constituting the hydrogen or negative element of the battery.

It is to be understood that my battery plates as herein described will not retain a charge of electricity as long as they are in the primary or depositing bath, and therefore differ from battery plates heretofore proposed.

Having fully described my invention, what I claim as new, and wish to secure by Letters Patent in the United States, is embodied in the following claim:

The process of making secondary battery plates which consists in submerging a perforated cathode and a lead anode in a combined alkali and acetic acid solution, connecting the cathode and anode with a source of electrical supply and thereby depositing the metal of the latter in the perforations in the former, then removing the plates from said solution, next subjecting them to pressure to compact the spongy deposited metal, and finally washing them in water.

In testimony whereof I have hereunto set my hand in the presence of two subscribing witnesses.

WILLIAM L. SILVEY.

Witnesses:
 G. HOGENDOBLER,
 CHAS. V. HUNSAKER.